(12) United States Patent
Kotte et al.

(10) Patent No.: US 8,146,727 B2
(45) Date of Patent: Apr. 3, 2012

(54) CLUTCH FOR TORQUE TRANSMISSION BETWEEN A SHAFT AND A ROLLER WHICH IS ARRANGED COAXIALLY AROUND THE SHAFT

(75) Inventors: Rainer Kotte, Elsenfeld-Rück (DE); Ralf Kotte, Elsenfeld-Rück (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 686 days.

(21) Appl. No.: 12/227,121

(22) PCT Filed: May 31, 2007

(86) PCT No.: PCT/EP2007/004799
§ 371 (c)(1),
(2), (4) Date: Nov. 7, 2008

(87) PCT Pub. No.: WO2007/137842
PCT Pub. Date: Dec. 6, 2007

(65) Prior Publication Data
US 2009/0205925 A1 Aug. 20, 2009

(30) Foreign Application Priority Data
Jun. 1, 2006 (DE) .................... 20 2006 008 681 U

(51) Int. Cl.
*F16D 25/08* (2006.01)
(52) U.S. Cl. .................... 192/85.57; 192/85.59

(58) Field of Classification Search ............... 192/85.57, 192/85.58, 85.59, 89.26; 254/317, 349, 350, 254/365
See application file for complete search history.

(56) References Cited

U.S. PATENT DOCUMENTS

| 3,510,082 | A | | 5/1970 | Sexton et al. ............... 242/68.2 |
| 3,853,303 | A | * | 12/1974 | Wineburner ................ 254/349 |
| 4,019,717 | A | * | 4/1977 | Freiburger ................. 254/349 |
| 4,024,936 | A | * | 5/1977 | Crabb ...................... 192/85.37 |
| 4,037,430 | A | | 7/1977 | Wright ........................ 64/9 R |
| 4,088,306 | A | * | 5/1978 | Falkner ...................... 254/350 |
| 4,187,936 | A | * | 2/1980 | Davenport .................. 254/350 |
| 4,408,746 | A | * | 10/1983 | Marsch et al. ............... 254/344 |
| 4,684,001 | A | * | 8/1987 | Carlson ..................... 192/85.41 |
| 2003/0151037 | A1 | * | 8/2003 | O'Fallon .................... 254/344 |

FOREIGN PATENT DOCUMENTS

| DE | 1 747 650 | 6/1957 |
| DE | 26 50 692 | 5/1977 |
| GB | 649306 | 1/1951 |
| GB | 2 214 270 A | 8/1989 |
| WO | WO 87/03943 | 7/1987 |

* cited by examiner

*Primary Examiner* — Rodney Bonck
(74) *Attorney, Agent, or Firm* — K&L Gates LLP

(57) ABSTRACT

The present invention relates to a clutch (20) for torque transmission between a shaft (2) and a roller (30) which is arranged coaxially around the shaft (2), comprising pneumatically actuable means for selectively interrupting and/or producing a force flow between the shaft (2) and roller (30), wherein the clutch (20) is arranged within the roller (30) coaxially between the shaft (2) and roller (30).

10 Claims, 4 Drawing Sheets

CLUTCH FOR TORQUE TRANSMISSION BETWEEN A SHAFT AND A ROLLER WHICH IS ARRANGED COAXIALLY AROUND THE SHAFT

CROSS-REFERENCE TO RELATED APPLICATIONS

This application claims the benefit of German patent application 20 2006 008 681.1, filed Jun. 1, 2006, herein incorporated by reference.

FIELD OF THE INVENTION

The invention relates to a clutch for transmitting torque between a shaft and a roller arranged coaxially around the shaft, comprising pneumatically actuable means for the selective interruption and/or production of a force flow between the shaft and roller.

BACKGROUND OF THE INVENTION

The driving of rotatably mounted drums, cylinders or rollers of stationary machines, such as, for example, paper machines, rotary machines or the likes, generally takes place by driving a shaft extending coaxially to a roller, the shaft and roller being connected to one another by means of a clutch transmitting the drive torque.

Clutches of the type which are arranged coaxially between a shaft and a roller arranged coaxially to the shaft are particularly space-saving here.

A clutch of this type for transmitting a torque between a spindle or shaft and a roller is known from German Patent Publication DE 26 50 692 A1.

In order to be able to temporarily stop or drive individual shafts and/or rollers of continuously driven machines, it is necessary to arrange a preferably remotely controllable clutch which can be disengaged and/or engaged between the drive and the respective roller.

A clutch of this type should be as easy as possible to activate, substantially maintenance-free and operable with simple means. Moreover, it is desirable that there is no risk of an explosion, and no danger of contamination of the product produced by a respective machine from the means for actuating the clutch, for example in the event of a defect. On the other hand, the means should be as easily available as possible.

A pneumatically actuable disc clutch for rope pulleys, belt pulleys or the like to be driven and freely rotatably mounted on a drive shaft is known from German Patent Publication DE 1 747 650 U1. To actuate the clutch, a pneumatic cylinder which is formed from a tube piece is provided, the piston of which is formed by a disc arranged in the tube. The clutch is disengaged, upon an interruption of the compressed air supply, by means of a spring against the restoring force of the piston. The clutch is arranged at the free end of the drive shaft, the pneumatic cylinder and the clutch discs having a larger diameter than the shaft and a drive shaft connected, for example, to a rope pulley. The disadvantage of this is that the known disc clutch projects both in the axial and in the radial direction over the drive shaft and the output shaft. Therefore, no mounting of the shafts is possible, for example, at the end at which the disc clutch is arranged. In addition, installation space is required as a result, which cannot be provided in a large number of machines. This makes the known disc clutch unusable for machines in which a two-sided mounting of the shaft and the roller arranged thereon is required. Moreover, a complete restoring of the clutch discs by the springs against the restoring force of the piston cannot be ensured so a high degree of wear of the clutch discs occurs as they already have slippage between them when a minimum pressing force is fallen below and thus abrade one another.

SUMMARY OF THE INVENTION

An object of the invention is therefore to provide a clutch with the aforementioned advantageous properties, which moreover is simply and economically constructed and can be actuated as easily as possible and without a large outlay for wiring, and which can be used on machines in which a two-sided mounting of the shaft and roller is required.

The object is achieved in a clutch of the type mentioned at the outset in that the clutch is completely arranged within the roller coaxially between the shaft and roller.

The clutch according to the invention, compared to the prior art, has the advantage that, without needing additional installation space, it allows a selective interruption or production of a force flow between a shaft and a roller arranged coaxially with respect to the shaft and the shaft can moreover be mounted at the two ends. Thus, the clutch according to the invention can be used in machines in which high precision is required when mounting shafts and rollers relative to one another by a two-sided mounting, for example in the case of paper machines, or else machines of the type in which the shafts and rollers have high masses because of their dimensions and therefore, likewise, a two-sided mounting is required. Operation of the clutch according to the invention moreover represents an easily available means which, for example, in the event of a defect, does not pose a risk of explosion or endanger the quality of a product produced by a machine which is provided with a clutch according to the invention, for example by soiling.

The subject of the invention therefore provides a clutch which can be actuated by compressed air for selective interruption or production of torque transmission between coaxially arranged shafts and rollers, which is simply and economically constructed, can be actuated easily and without a large outlay for wiring, and can, in particular, be used in machines, in which a two-sided mounting of the shaft and roller is necessary.

An advantageous configuration of the invention provides that the pneumatically actuable means comprise a pneumatic cylinder arranged coaxially between the shaft and cylinder and rotatably mounted relative to the shaft and the roller, comprising a clutch disc arranged on its extendable end, which pneumatic cylinder acts with its piston on a clutch disc rotatably arranged relative to the piston and non-rotationally connected to the shaft or roller, and presses it, on actuation of the clutch against a corresponding face non-rotationally connected to the roller or shaft, and/or lifts it therefrom.

The pneumatic cylinder preferably comprises a circular piston arranged coaxially between the shaft and roller. As a result, the shaft can be guided through the pneumatic cylinder, simultaneously achieving as large a piston face as possible.

So that the pneumatic cylinder does not co-rotate with the shaft or roller, it is conceivable to connect the pneumatic cylinder with its cover facing the end of the shaft to an abutment. The abutment may be configured as a plate with a central opening for guiding the shaft through, which can be connected to a component provided for mounting the shaft.

Another advantageous configuration of the invention provides that the pneumatic cylinder comprises a restoring spring, which, upon an interruption of the compressed air supply, returns the piston of the pneumatic cylinder into a starting position. This ensures that the clutch disc, on non-actuation of the clutch, in other words when there is an interruption of the compressed air supply to the pneumatic cylinder, is safely moved into the position which is then desired, and no further pressing force of the clutch disc against the corresponding face is produced by the piston of the pneumatic cylinder. This avoids excessive wear of the clutch disc, for example by rubbing on the corresponding face.

An additional advantageous configuration of the invention provides that the pneumatically actuable means are only used to interrupt or produce a force flow between the shaft and the roller, and spring-loaded means are provided for the reverse process, in other words to produce or interrupt the force flow. As a result, the activation of the clutch is significantly simplified, in particular it can be ensured that owing to the spring-loaded means, in the event of a failure of the compressed air supply, a preferably desired operating state of the clutch is produced, for example engaged or disengaged.

A particularly advantageous configuration of the invention provides that the spring-loaded means comprise one or more compression springs preferably arranged coaxially to a pneumatic cylinder, for example a spiral spring, disc spring or the like.

An additional, particularly advantageous configuration of the invention provides that the piston of the pneumatic cylinder, upon a supply of compressed air, lifts the clutch disc from the corresponding face against the spring loading, the spring-loaded means, preferably configured as a compression spring, pressing the clutch disc against the corresponding face when the pneumatic cylinder is cut off from the compressed air supply, in other words in the event of an interruption of the compressed air supply.

An advantageous configuration of the invention provides that the clutch disc is non-rotationally connected to the roller, and the corresponding face is non-rotationally connected to the shaft.

Another advantageous configuration of the invention provides that the non-rotational connection between the roller and clutch disc takes place by means of grooves extending on the inside on the roller parallel to the longitudinal axis thereof, as well as projections arranged on the clutch disc and engaging in the grooves. The clutch disc can be longitudinally displaced relative to the roller owing to the use of grooves and projections. It is likewise conceivable to provide a carrier pressed in the roller, which carrier has the grooves provided to entrain the clutch disc, and/or projections. This simplifies the production decisively as handling the relatively large roller is laborious.

A particularly advantageous configuration of the invention provides that the corresponding face comprises a face extending normal to the longitudinal axis of the shaft, of a hub arranged on the inside in the roller and non-rotationally connected to the shaft. A friction lining is preferably arranged on the corresponding face. The friction lining is preferably replaceable.

DETAILED DESCRIPTION OF THE PREFERRED EMBODIMENTS

Figure 1:
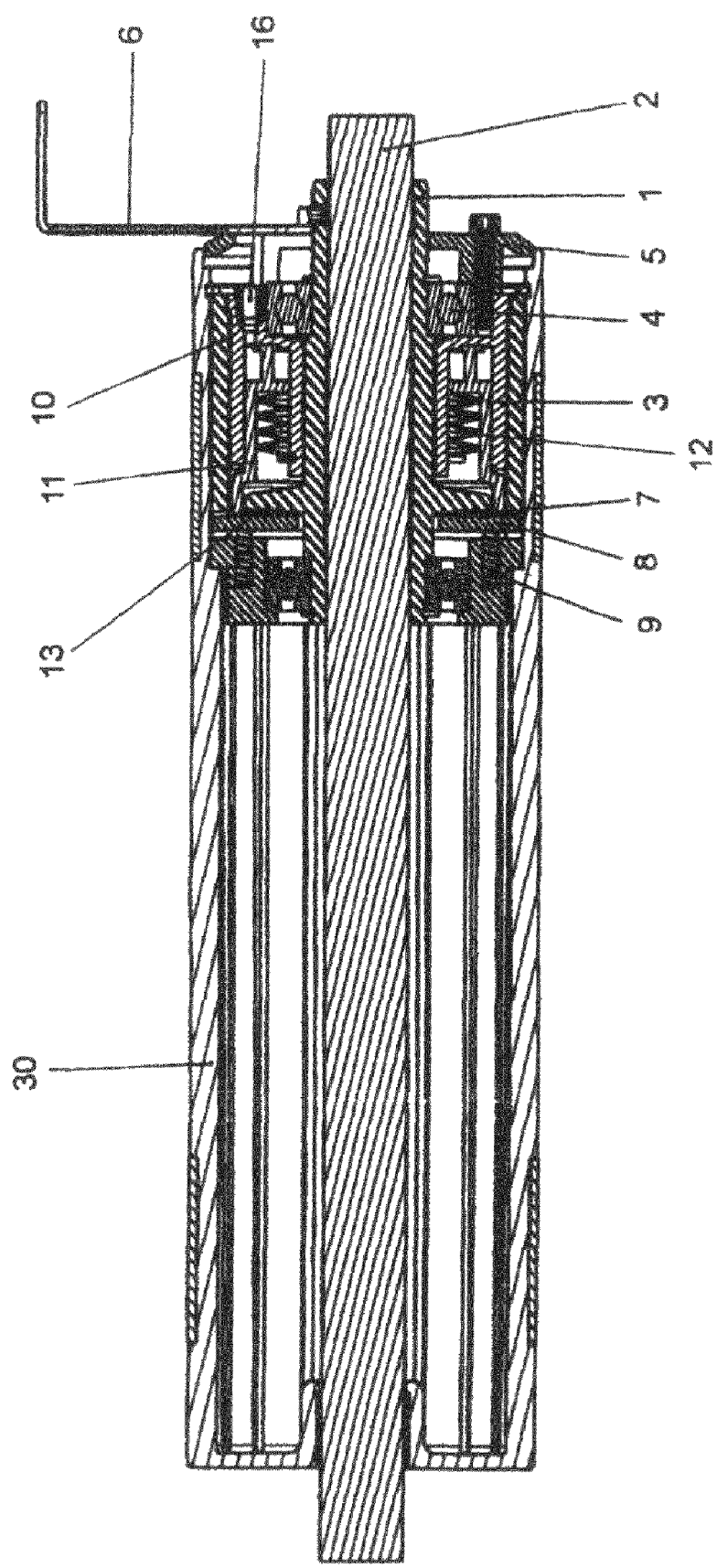
FIG. 1 shows a schematic view of a longitudinal section through a clutch according to the invention arranged coaxially between a shaft and a roller.
Figure 2:
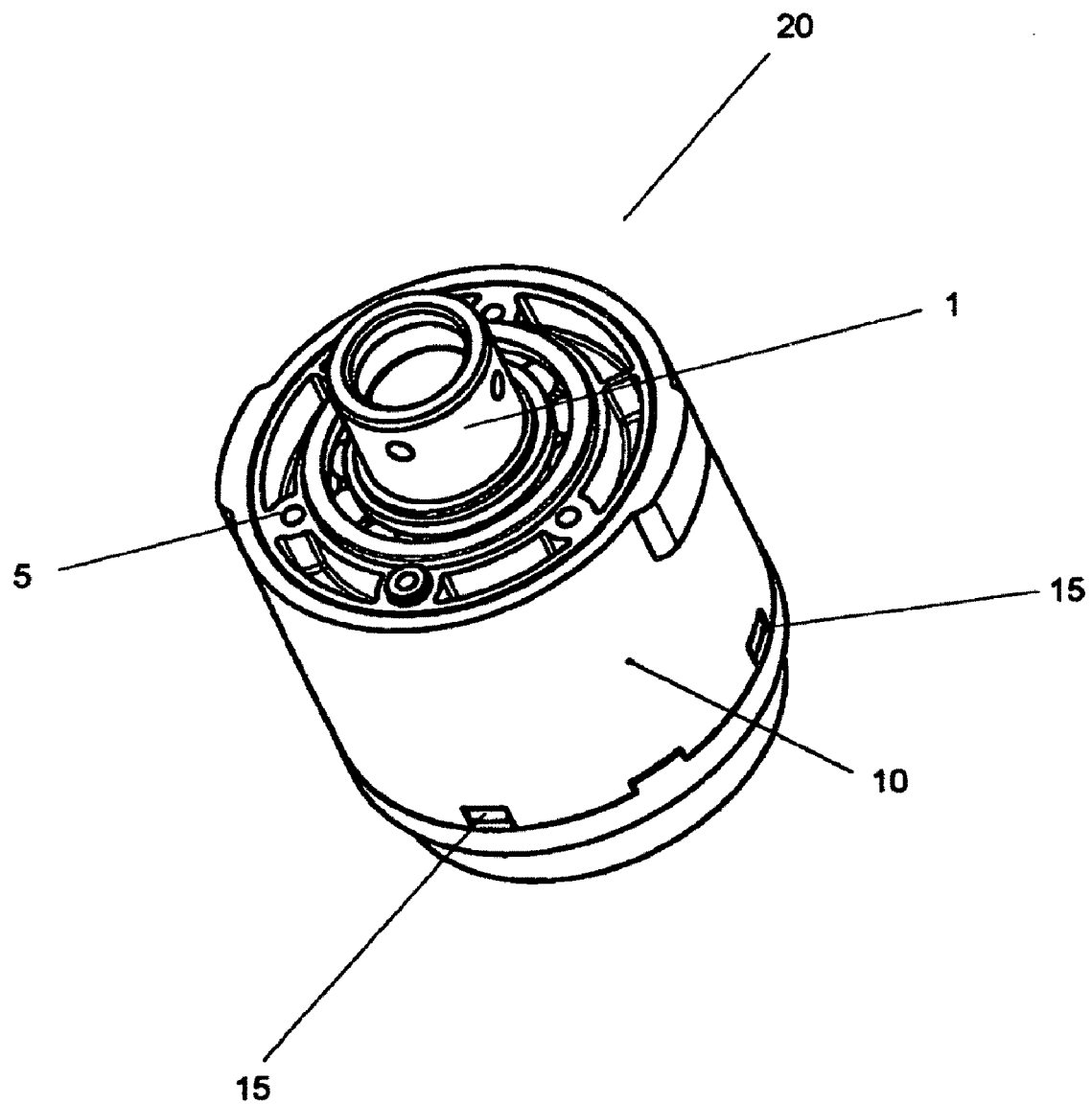
FIG. 2 shows a perspective view of the clutch according to the invention from FIG. 1 without the shaft and roller.
Figure 3:
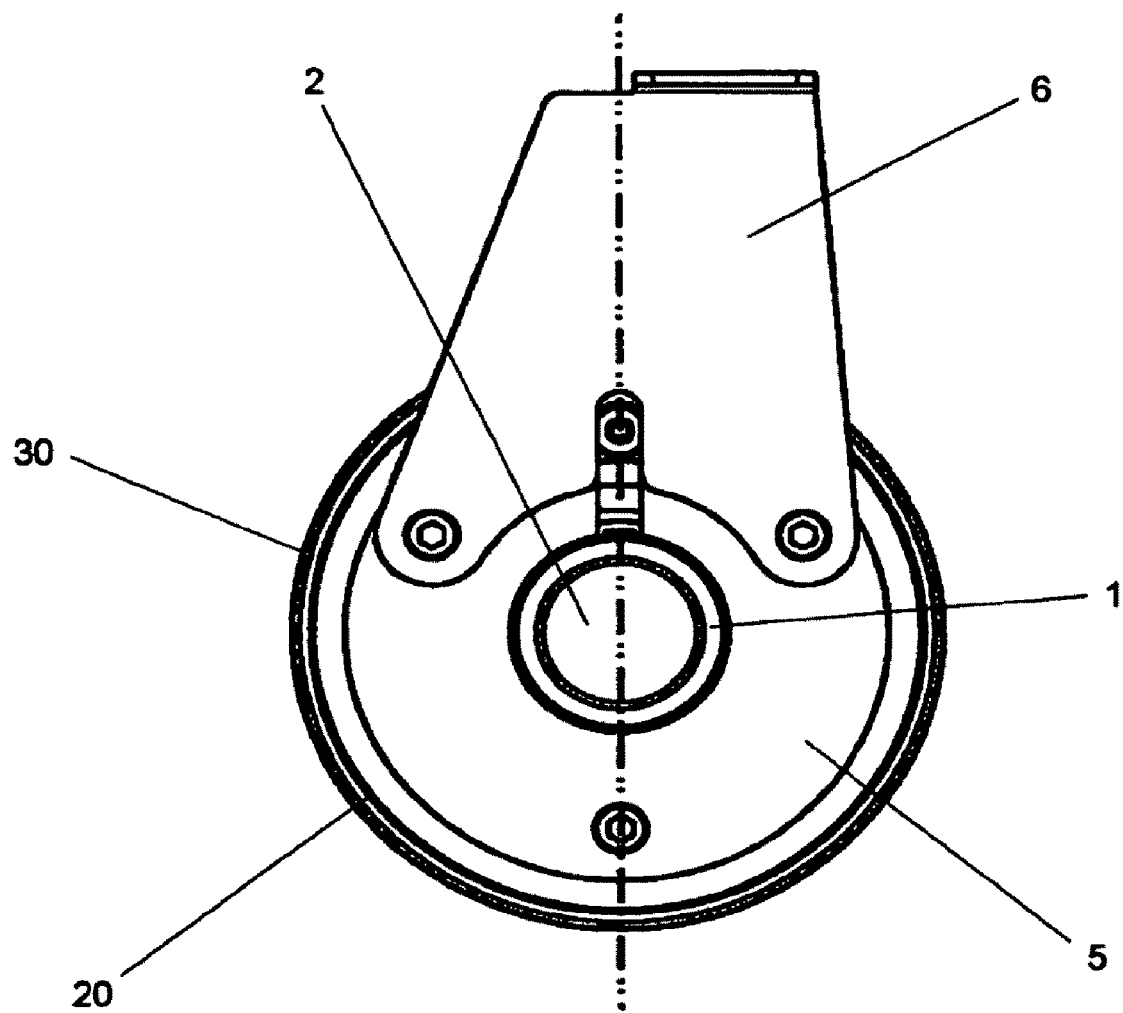
FIG. 3 shows a side view of the clutch according to the invention from FIG. 1.

A clutch 20 according to the invention shown in FIG. 1 to 3 is arranged inside a roller 30 coaxially between the roller 30 and a shaft 2. The clutch 20 substantially comprises a pneumatic cylinder 3 arranged coaxially between the shaft 2 and roller 30 and rotatably mounted relative to the shaft 2 and roller 30, comprising a circular piston 11. The piston 11 acts on a clutch disc 8, which is non-rotationally connected to the roller 30. A hub 1 non-rotationally connected to the shaft 2 has a face 13 corresponding to the clutch disc 8. Compression springs 9 press the clutch disc 8 against the corresponding face 13. The piston 11 of the pneumatic cylinder 3, upon a supply of compressed air, lifts the clutch disc 8 from the corresponding face 13 and interrupts the force flow between the shaft 2 and roller 30. The roller 30 then stands still even if the shaft 2 continues to be driven. The clutch 20 is screwed to the hub 1 on the shaft 2. Located in the clutch 20 is an annular pneumatic cylinder 3 which is decoupled by a ball bearing 4 from the rotating parts of the clutch 20. The pneumatic cylinder 3 is screwed to a cover 5 and an abutment 6 and is thereby held tight.

If the pneumatic cylinder 3 is pressureless, the clutch 20 is engaged and the force flow goes via the shaft 2, the corresponding face 13 of the hub 1 provided with a friction lining 7 onto the clutch disc 8, which is pressed by compression springs 9. For disengagement, compressed air is supplied to the pneumatic cylinder 3. Compressed air is introduced, for example, into the pneumatic cylinder 3 via an external 3/2-way valve through an air inlet 16. As a result, the piston 11 of the pneumatic cylinder 3 is extended and presses the clutch disc 8 away from the friction lining 7 of the corresponding face 13. As a result, the force flow is interrupted and the roller 30 stands still.

The pneumatic cylinder 3 is preferably single-acting and the piston 11 is compressed by disc springs 12. The entraining force, corresponding to the torque which can be transmitted by the clutch 20, may be varied by the strength of the compression springs 9.

Figure 4:
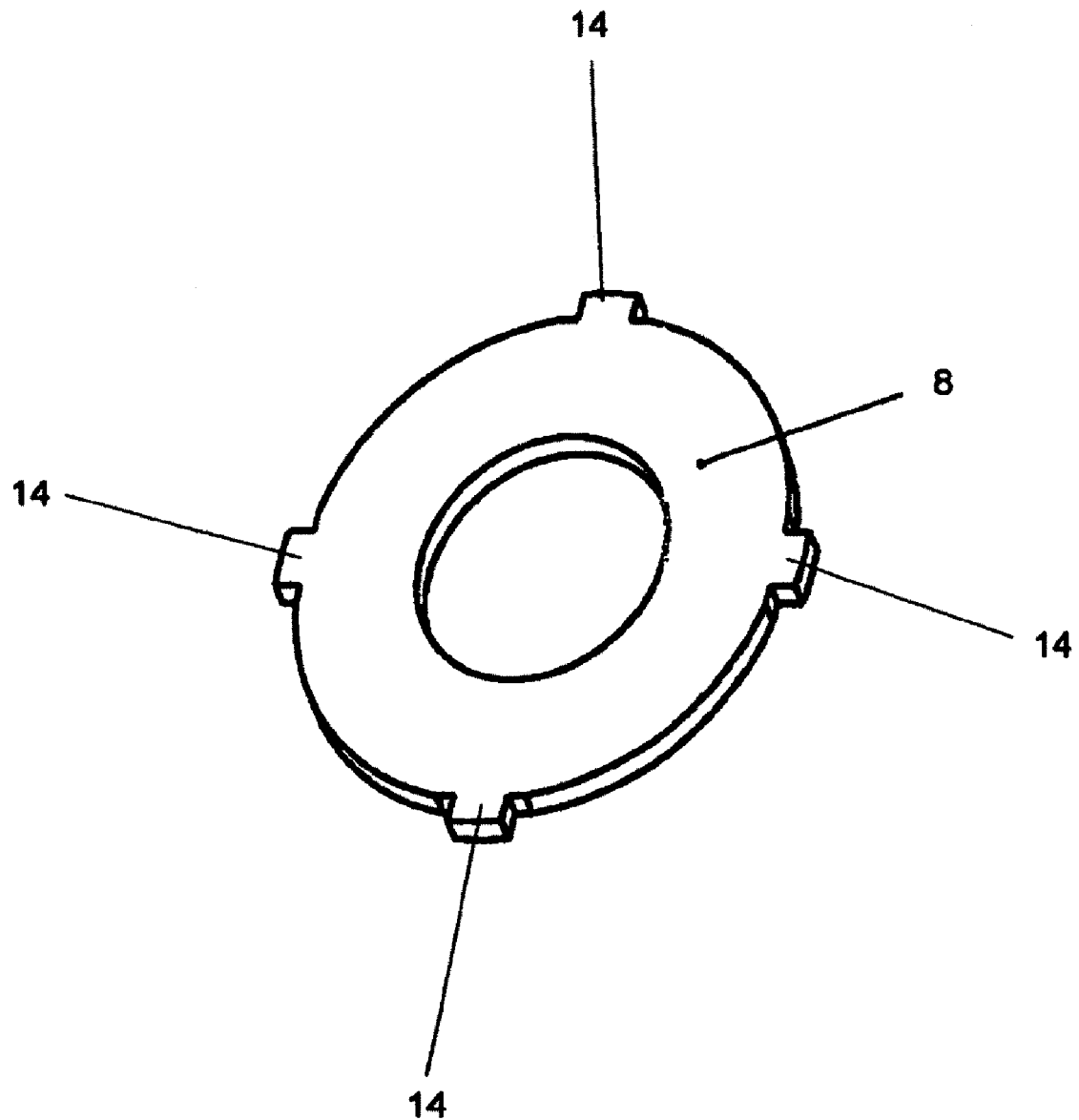
FIG. 4 shows a perspective detailed view of a clutch disc of a clutch according to the invention.

The clutch disc 8 has, at its periphery, four segments 14 (FIG. 4), which engage in corresponding recesses 15 of the carrier 10 (FIG. 2) and thus produce the force flow to the roller.

A roller designed, for example, as a winding cylinder, friction roller or the like can be coupled to or decoupled from a continuously rotating shaft by the pneumatic clutch according to the invention.

The invention can be industrially applied in particular in the area of the production of clutches for torque transmission between coaxially arranged shafts and rollers.

LIST OF REFERENCE NUMERALS 1 hub
2 shaft
3 pneumatic cylinder
4 ball bearing
5 cover
6 abutment
7 friction lining
8 clutch disc
9 compression spring
10 carrier 11 piston
12 disc spring
13 corresponding face
14 segment
15 recess
16 air inlet
20 clutch
30 roller

What is claimed is:

1. Clutch (20) for transmitting torque between a shaft (2) and a roller (30) arranged coaxially around the shaft (2), comprising pneumatically actuatable means for selectively interrupting or producing a force flow between the shaft (2) and roller (30), characterized in that the clutch (20) is arranged inside the roller (30) coaxially between the shaft (2) and roller (30), and wherein the pneumatically actuatable means comprises a pneumatic cylinder (3) with a piston (11) movable therein, the pneumatic cylinder being rotatably mounted relative to the shaft (2) and the roller (30) with the piston (11) acting on a rotatably arranged clutch disc (8) non-rotationally connected to the shaft (2) or roller (30) for pressing said clutch disc, on actuation of the clutch, against a corresponding face (13) non-rotationally connected to the roller (30) or shaft (2), or alternatively for lifting said clutch disk from said corresponding face (13).

2. Clutch according to claim 1, characterized in that the pneumatic cylinder (3) comprises a circular piston arranged coaxially between the shaft (2) and roller (30).

3. Clutch according to claim 1 or 2, characterized in that the pneumatic cylinder (3) comprises a restoring spring (12), which, upon an interruption of the compressed air supply, returns the piston (11) of the pneumatic cylinder (3) into a starting position.

4. Clutch according to claim 1, characterized in that the pneumatically actuable means are operable only to alternatively interrupt or produce a force flow between the shaft (2) and the roller (30), and spring-loaded means are provided to act in opposition to the pneumatically actuable means.

5. Clutch according to claim 4, characterized in that the spring-loaded means comprise a compression spring (9).

6. Clutch according to either of claim 4 or 5, characterized in that the piston (11) of the pneumatic cylinder (3), upon a supply of compressed air, lifts the clutch disc (8) from the corresponding face (13) against the spring loading, wherein the spring-loaded means (9) presses the clutch disc (8) against the corresponding face (13) when the supply of compressed air is interrupted.

7. Clutch according to claim 1, characterized in that the clutch disc (8) is non-rotationally connected to the roller (30) and the corresponding face (13) is non-rotationally connected to the shaft.

8. Clutch according to claim 7, characterized in that the non-rotational connection between the roller (30) and clutch disc (8) takes place by means of grooves (15) extending on the inside on the roller (30) parallel to the longitudinal axis thereof, and projections (14) arranged on the clutch disc (8) and engaging in the grooves (15).

9. Clutch according to claim 7, characterized in that the non-rotational connection between the roller (30) and clutch disc (8) is formed by means of a carrier (10), which can be arranged in the roller and has grooves (15) extending parallel to the longitudinal axis of the roller (30), as well as projections (14) arranged on the clutch disc (8) and engaging in the grooves (15) of the carrier.

10. Clutch according to claim 1, characterized in that the corresponding face comprises a face (13) extending normally to the longitudinal axis of the shaft (2) of a hub (1) arranged on the inside in the roller (30) and non-rotationally connected to the shaft (2).

\* \* \* \* \*